United States Patent
Farr, II

(10) Patent No.: US 9,044,812 B2
(45) Date of Patent: Jun. 2, 2015

(54) JIG AND METHOD FOR MODIFYING CASING IN TURBINE SYSTEM

(75) Inventor: Lawrence Brown Farr, II, Greenville, SC (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 13/197,190

(22) Filed: Aug. 3, 2011

(65) Prior Publication Data

US 2013/0034397 A1 Feb. 7, 2013

(51) Int. Cl.
*B23B 49/02* (2006.01)
*B23B 47/28* (2006.01)

(52) U.S. Cl.
CPC ............. *B23B 47/28* (2013.01); *Y10T 408/567* (2015.01); *Y10T 408/568* (2015.01); *Y10T 29/49238* (2015.01); *B23B 49/02* (2013.01); *B23B 2247/00* (2013.01); *B23B 2215/76* (2013.01); *B23B 2247/12* (2013.01)

(58) Field of Classification Search
CPC .... B23B 49/02; B23B 47/28; B23B 51/0054; B23B 2247/00
USPC ............... 408/115 R, 115 B, 72 B, 97, 79, 80
See application file for complete search history.

(56) References Cited

U.S. PATENT DOCUMENTS

| | | | |
|---|---|---|---|
| 1,782,284 A * | 11/1930 | Betancourt | 408/16 |
| 2,466,023 A | 4/1949 | Griffin | |
| 2,670,639 A * | 3/1954 | Flowers et al. | 408/54 |
| 2,825,143 A * | 3/1958 | Polivka | 33/520 |
| 2,996,936 A * | 8/1961 | Blaise | 408/16 |
| 3,363,488 A | 1/1968 | Thau et al | |
| 3,366,426 A | 1/1968 | Kraus | |
| 3,517,567 A | 6/1970 | Willmann | |
| 3,603,039 A | 9/1971 | Stahr | |
| 3,635,571 A | 1/1972 | Roberts et al. | |
| 3,661,490 A * | 5/1972 | Trueblood | 425/548 |
| 3,680,193 A | 8/1972 | Scaminaci, Jr. et al. | |
| 3,764,204 A | 10/1973 | Kammeraad | |

(Continued)

FOREIGN PATENT DOCUMENTS

DE 19921215 A1 11/2000
DE 202007011551 U1 10/2007

(Continued)

OTHER PUBLICATIONS

Search Report and Written Opinion from EP Application No. 12178545.5 dated Oct. 25, 2012.

*Primary Examiner* — Daniel Howell
*Assistant Examiner* — Chwen-Wei Su
(74) *Attorney, Agent, or Firm* — Dority & Manning, P.A.

(57) ABSTRACT

A jig and a method for modifying a casing in a turbine system are disclosed. The jig includes a body and a protrusion extending from the body. The protrusion is configured for engaging a hole defined in a spot face on the casing. The jig further includes at least one machining passage defined in the body, the machining passage provided for machining the casing therethrough, and at least one alignment feature configured on the body, the at least one alignment feature provided for aligning the jig with respect to the casing. The method includes engaging a jig with a hole defined in a spot face on the casing, aligning the jig with respect to the casing, and machining at least one installation hole into the casing through the spot face.

19 Claims, 7 Drawing Sheets

(56) References Cited

U.S. PATENT DOCUMENTS

| | | | |
|---|---|---|---|
| 3,790,295 A | 2/1974 | Grunert | |
| 4,093,394 A | 6/1978 | Adams | |
| 4,153,384 A | 5/1979 | Ishaken | |
| 4,248,554 A | 2/1981 | Boucher et al. | |
| 4,306,823 A | 12/1981 | Nashlund | |
| 4,445,277 A | 5/1984 | Keefe | |
| 4,865,496 A | 9/1989 | Challis | |
| 5,046,901 A | 9/1991 | Taylor | |
| 5,158,406 A | 10/1992 | Ulinskas | |
| 5,209,614 A * | 5/1993 | Matthews | 408/1 R |
| 5,309,662 A | 5/1994 | Goodwin et al. | |
| D356,271 S | 3/1995 | Adamik et al. | |
| 5,423,156 A | 6/1995 | Nellessen, Jr. | |
| 5,462,550 A | 10/1995 | Dietz et al. | |
| 5,775,036 A | 7/1998 | Stanley, Sr. | |
| 5,785,569 A | 7/1998 | Stansbury et al. | |
| 5,800,099 A * | 9/1998 | Cooper | 408/1 R |
| 5,915,891 A * | 6/1999 | Fridman | 408/1 R |
| 5,931,235 A | 8/1999 | Weixler | |
| 5,987,767 A | 11/1999 | Roddie | |
| 6,109,839 A | 8/2000 | Thomas | |
| 6,398,465 B1 | 6/2002 | Monge | |
| 6,466,179 B1 | 10/2002 | Ehrenberg et al. | |
| 6,659,695 B2 * | 12/2003 | Park | 408/103 |
| D546,212 S | 7/2007 | Rooney | |
| 7,576,859 B2 | 8/2009 | Okamuro et al. | |
| 7,643,144 B2 | 1/2010 | Okamuro et al. | |
| 2006/0020703 A1 | 1/2006 | England et al. | |
| 2006/0210367 A1 | 9/2006 | Liu | |
| 2008/0062420 A1 | 3/2008 | Okamuro et al. | |
| 2008/0068610 A1 | 3/2008 | Okamuro et al. | |
| 2009/0169316 A1 * | 7/2009 | Wadley et al. | 408/92 |
| 2010/0254788 A1 | 10/2010 | Dromard et al. | |

FOREIGN PATENT DOCUMENTS

| | | |
|---|---|---|
| DE | 202008003936 U1 | 5/2008 |
| EP | 1 852 072 A3 | 11/2007 |
| EP | 2 075 829 A1 | 7/2009 |
| GB | 2024674 A | 1/1980 |
| WO | 2010 085573 A1 | 7/2010 |
| WO | 2010 128320 A1 | 11/2010 |

* cited by examiner

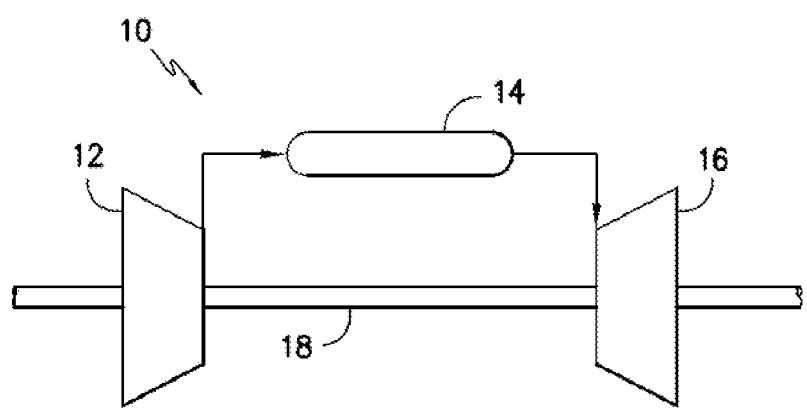
FIG. −1−

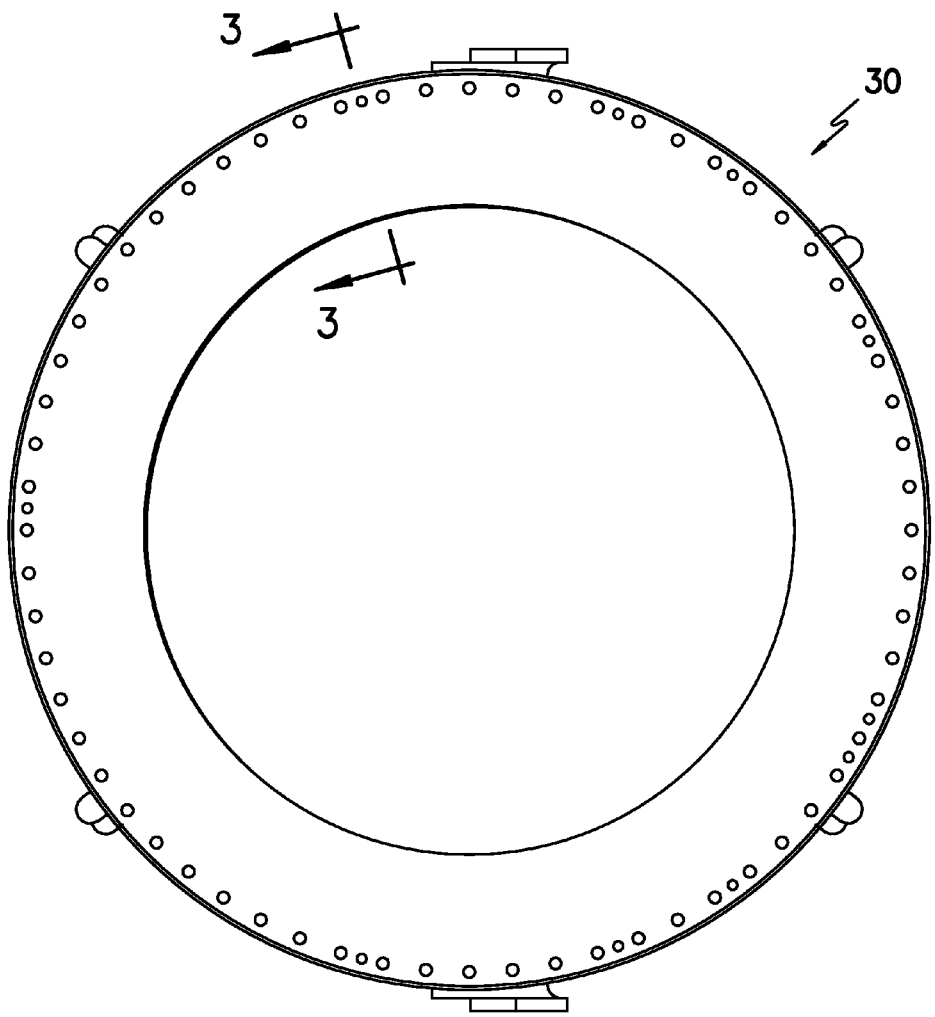
FIG. -2-
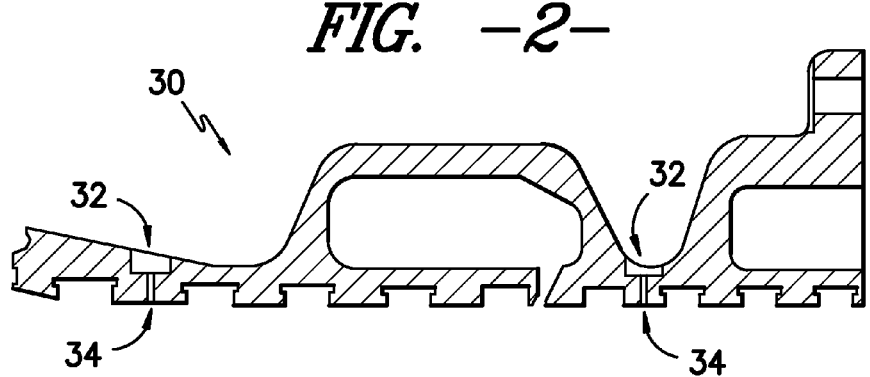
FIG. -3-

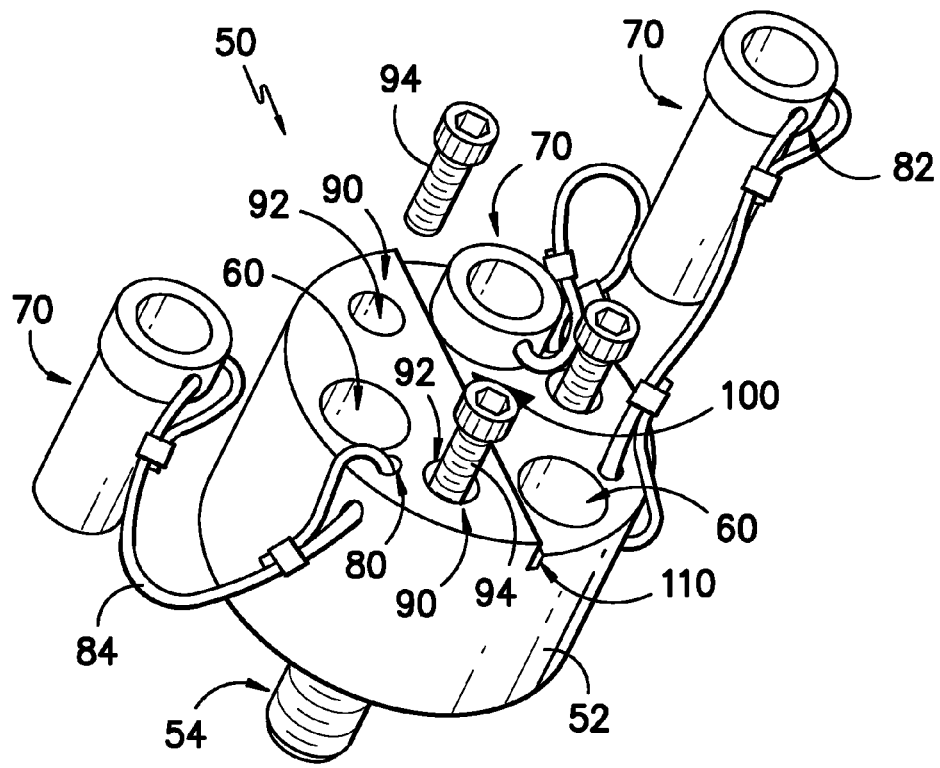
FIG. -4-
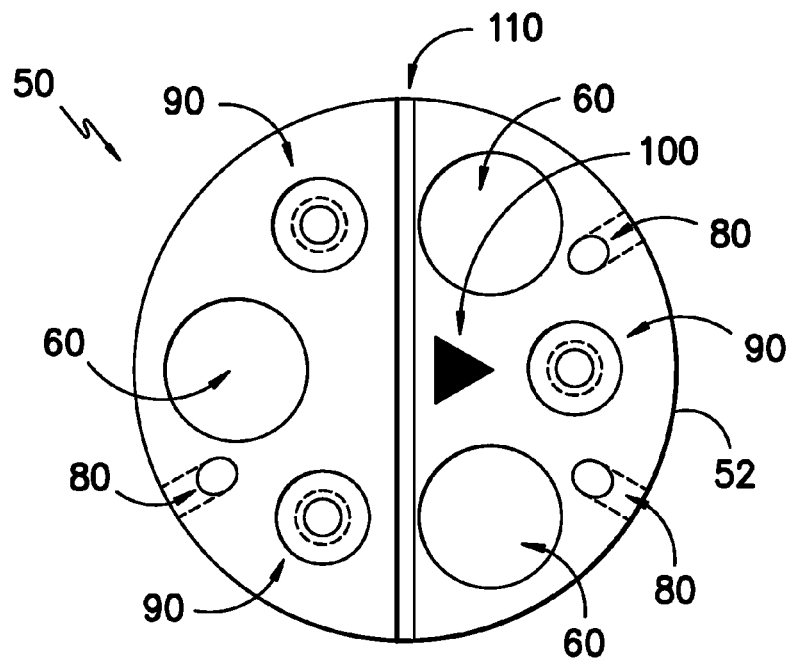
FIG. -5-

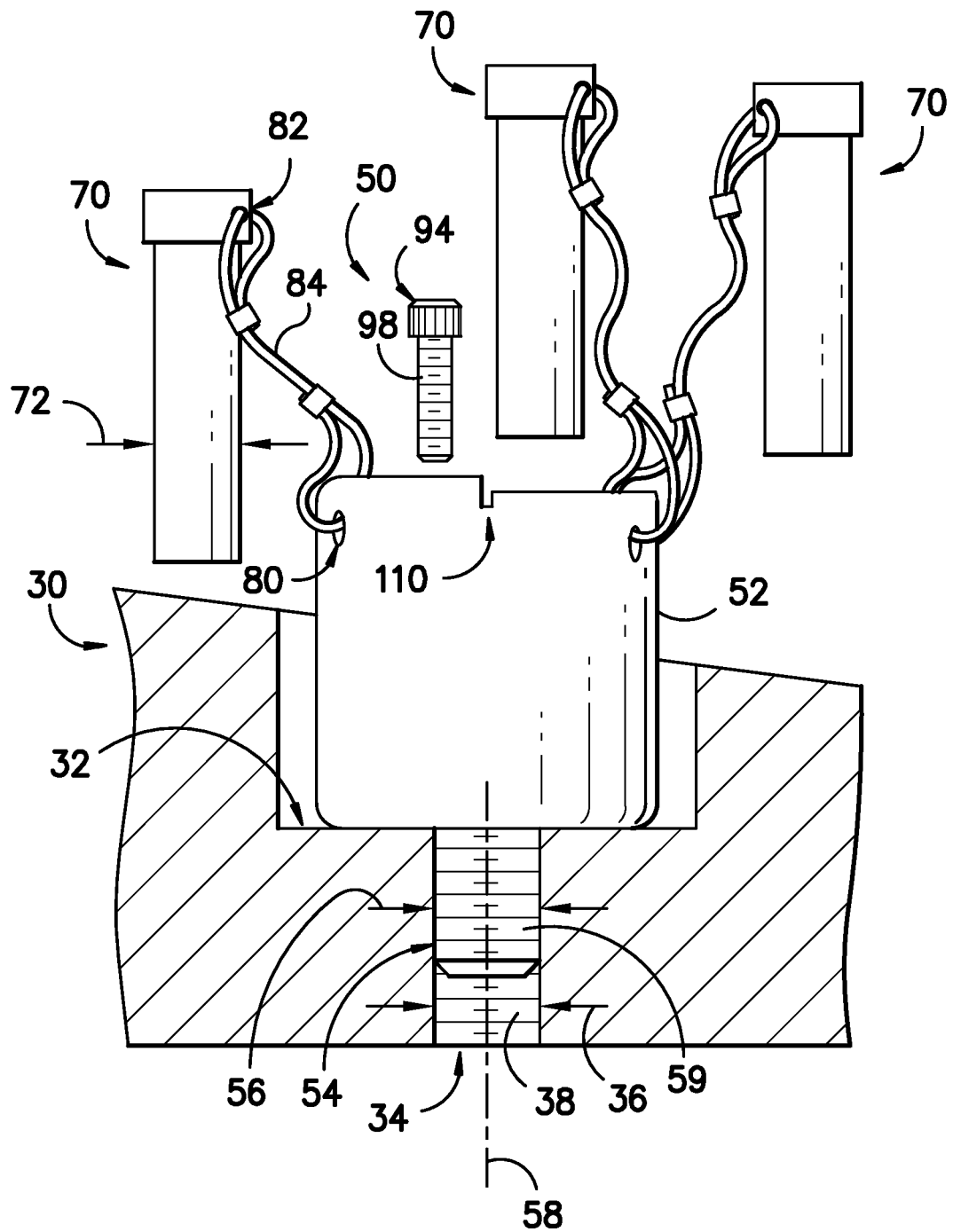
FIG. -6-

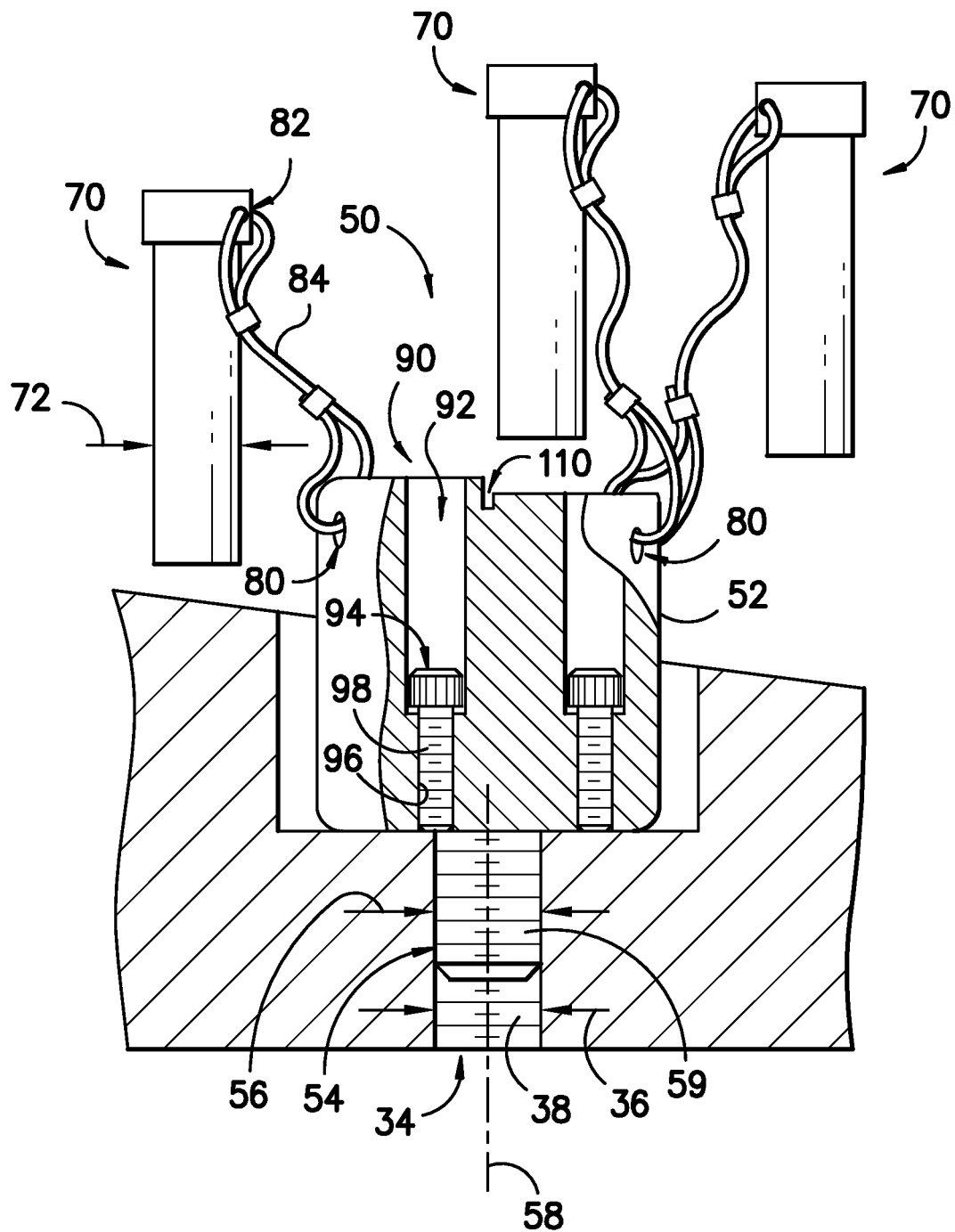
FIG. -7-

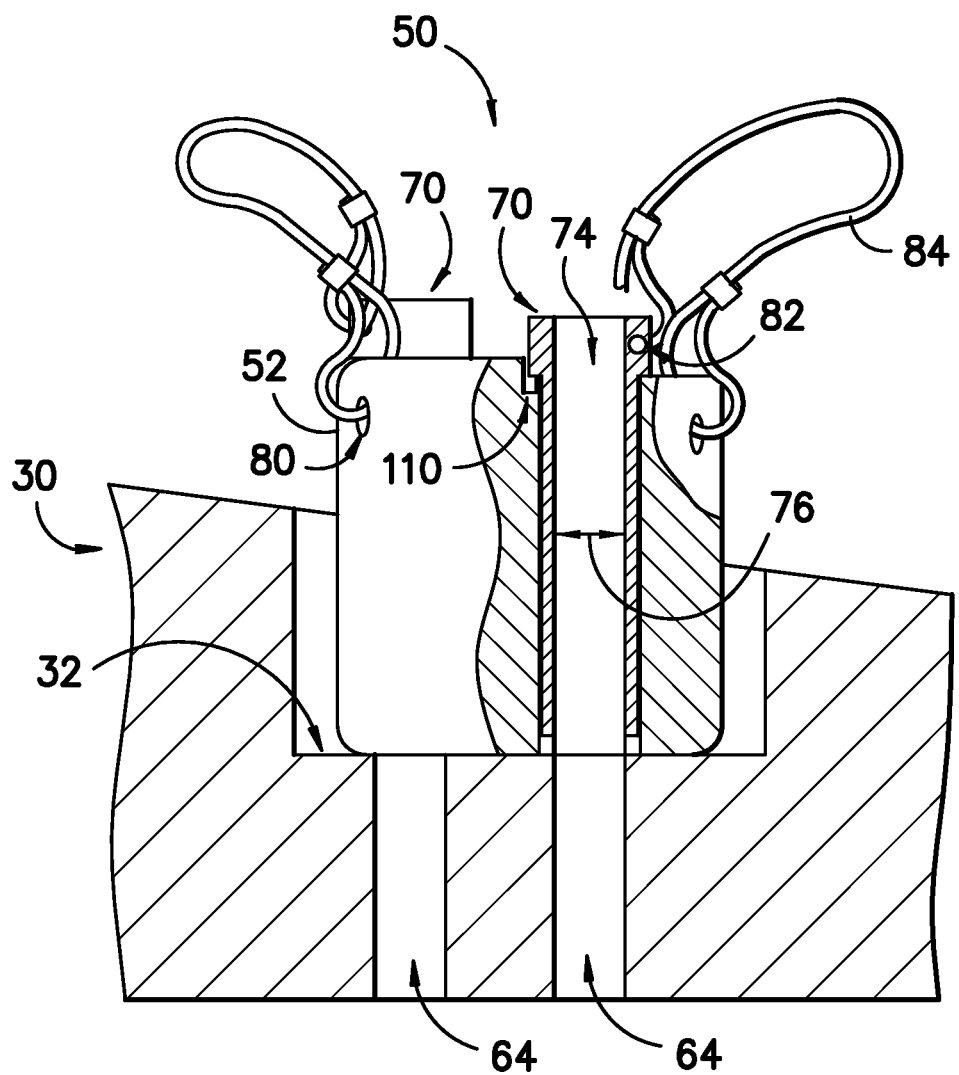
FIG. -8-

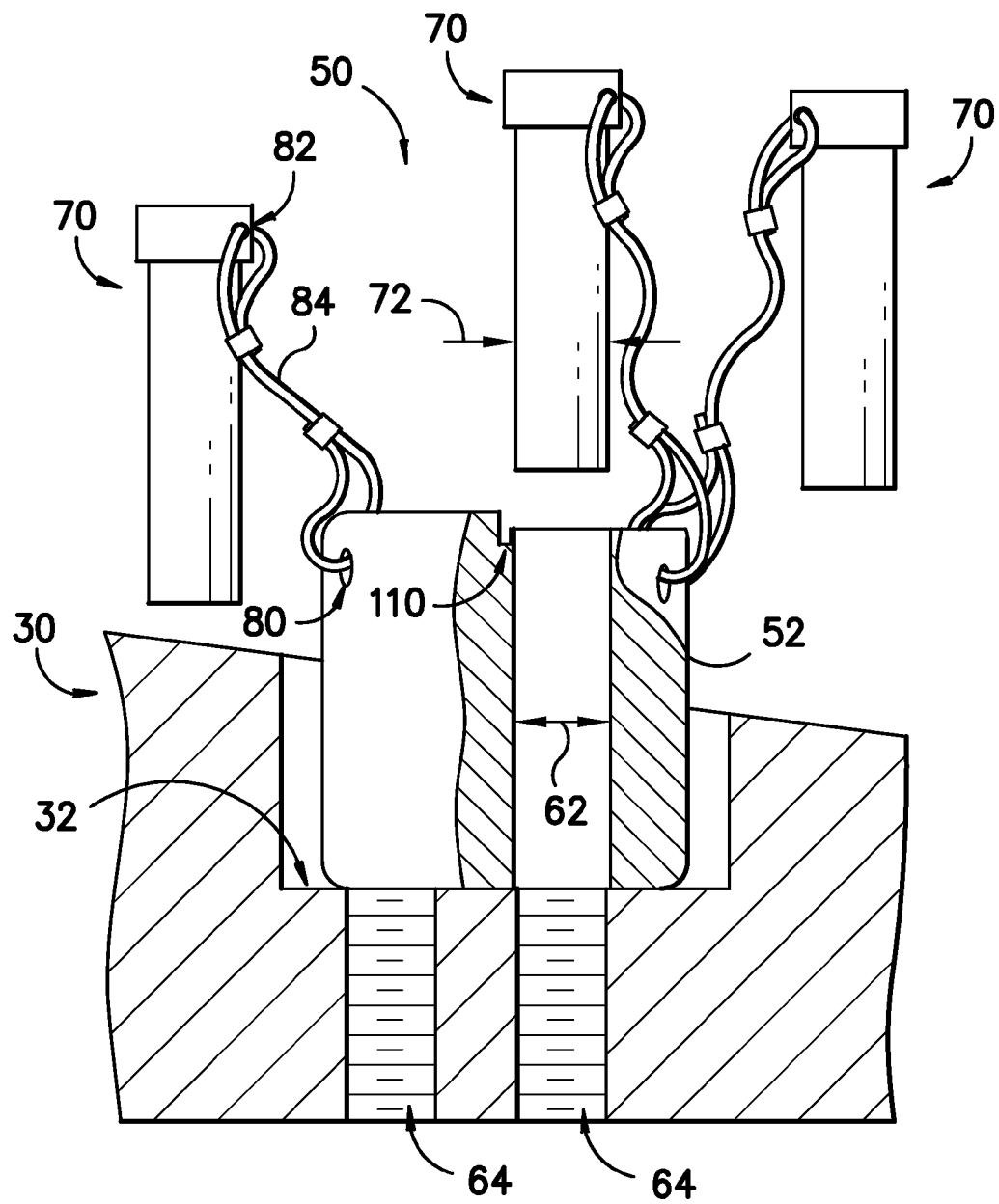
FIG. —9—

JIG AND METHOD FOR MODIFYING CASING IN TURBINE SYSTEM

FIELD OF THE INVENTION

The present disclosure relates in general to turbine systems, and more particularly to methods and apparatus for modifying the casings of turbine systems.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

Frequently, various probes are utilized to measure the performance of a turbine system. During manufacturing of the turbine systems, various preparations are made for mounting the probes in various locations on a turbine system. For example, after components of the system, such as casings, are formed, spot faces are machined into the components. The spot faces are various areas where probes could be mounted to the system. Further, holes are machined through the spot faces to facilitate the mounting of the various probes. These holes are then typically plugged for normal operation of the system.

Before, during, and after operation of the system, various locations may be chosen for mounting of a probe or probes. These locations may vary dependent on the desired tests needed to be performed for an individual system or other various parameters. When a location is chosen, a probe is mounted through a spot face in that location. Further, in order for the probe to provide accurate and consistent data, the probe must be precisely installed.

Previously, in order to ensure such precise installation of a probe, the component of the turbine on which the probe was to be installed was removed from the system and transported from the field to a facility where the proper modifications could be made to the component to facilitate precise installation of the probe. However, particularly in the case of casings components in, for example, a gas or steam turbine system, this is an expensive and time-consuming procedure. For example, many systems are in remote locations, and the time and expense required to ship a casing to a machining facility for modification is extremely high and often prohibitive.

Thus, an improved apparatus and method for modifying a casing or other component of a turbine system would be desired. Specifically, an apparatus and method that allow for in-field modification of a casing or other component would be advantageous.

BRIEF DESCRIPTION OF THE INVENTION

Aspects and advantages of the invention will be set forth in part in the following description, or may be obvious from the description, or may be learned through practice of the invention.

In one embodiment, a jig for modifying a casing in a turbine system is disclosed. The jig includes a body and a protrusion extending from the body. The protrusion is configured for engaging a hole defined in a spot face on the casing. The jig further includes at least one machining passage defined in the body, the machining passage provided for machining the casing therethrough, and at least one alignment feature configured on the body, the at least one alignment feature provided for aligning the jig with respect to the casing.

In another embodiment, a method for modifying a casing in a turbine system is disclosed. The method includes engaging a jig with a hole defined in a spot face on the casing. The jig includes at least one machining passage and at least one alignment feature. The method further includes aligning the jig with respect to the casing, and machining at least one installation hole into the casing through the spot face.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic illustration of one embodiment of a turbine system according to the present disclosure;

FIG. 2 is a front cross-sectional view of one embodiment of a casing according to the present disclosure;

FIG. 3 is a side cross-sectional view of one embodiment of a casing according to the present disclosure;

FIG. 4 is a perspective view of a jig according to one embodiment of the present disclosure;

FIG. 5 is a top view of a jig according to one embodiment of the present disclosure;

FIG. 6 is a side view of a jig engaged in a hole defined in a spot face according to one embodiment of the present disclosure;

FIG. 7 is a side view of a jig aligned in a hole defined in a spot face according to one embodiment of the present disclosure;

FIG. 8 is a side view of a jig aligned in a hole defined in a spot face and with bushings engaged therein according to one embodiment of the present disclosure; and FIG. 9 is a side view of a jig aligned in a hole defined in a spot face after machining of installation holes according to one embodiment of the present disclosure;

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbine system 10. The system 10 may include a compressor 12, combustor 14, and turbine 16. Further, the system 10 may include a plurality of compressors 12, combustors 14, and turbines 16. The compressor 12 and turbine 16 may be coupled by a shaft 18. The shaft 18 may be a single shaft or a plurality of shaft segments coupled together to form shaft 18. It should be understood that the turbine system according to the present disclosure may be a gas turbine system, a steam turbine system, or any other suitable turbine system.

FIGS. 2 and 3 illustrate one embodiment of a casing 30. The casing 30 is located in the turbine system 10, and surrounds various components in a section of the turbine system 10, such as stator and rotor components. For example, the casing 30 may be for a compressor 12, a turbine 16, or any other suitable section of the system 10. As shown in FIG. 3, a plurality of spot faces 32 may be machined into or otherwise provided on the casing 30 during or after manufacturing. A spot face 32 is a generally planar surface on the exterior of the casing 30, as shown. Typically, spot faces 32 in various locations on the casing 30 that may be utilized before, during, or after operation of the system for various purposes, such as testing of the system 10. In many such cases, various modifications are made to the casing 30 on one or more of the spot faces 32. Further, many spot faces 32 may include holes 34 defined therein to facilitate such modification. Each hole may have an inner width or diameter 36, and in exemplary embodiments may have a threaded inner wall 38. The holes 34 are typically plugged during operation of the system 10, but may be unplugged as required for modification of a spot face 32.

One purpose requiring modification of a spot face 32 is the use of various probes to conduct various tests on the system 10. For example, clearance probes, proximity probes, or any other suitable probes may be utilized in the system to conduct various tests and provide various data regarding the performance of the system 10. A probe must typically be precisely placed with respect to the spot face 32 and casing 30 in order for it to provide accurate, reliable data.

Thus, as shown in FIGS. 4 through 9, a jig 50 is provided for modifying a casing 30 in a turbine system 10. In particular, the jig 50 is provided for precisely and accurately modifying a spot face 32 such that a probe can be precisely mounted thereon. Further, the jig 50 according to the present disclosure advantageously allows for in-field modification of the casing 30. Thus, expensive and time-consuming transportation of the casing 30 to a facility in order to modify a spot face 32 is avoided.

As shown, jig 50 includes a body 52 and a protrusion 54 extending from the body 52. While the body 52 illustrated in FIGS. 4 through 9 is cylindrical, it should be understood that the body 52 may have any suitable shape and size capable of housing the various features discussed herein. Further, the body in exemplary embodiments fits within a spot face 32.

Protrusion 54 extends from the body 52. The protrusion 54 may be integral with the body 52 and thus extend therefrom, or may be a separate component from the body 52 that is fastened thereon. In some embodiments, the protrusion 54 may be a generally central protrusion 54, thus extending from a central location on a surface of the body 52. Additionally, the protrusion 54 has an outer width or diameter 56, and extends along axis 58, as shown in FIGS. 6 and 7. Axis 58 in exemplary embodiments is generally perpendicular to a surface of the body 52 from which the protrusion extends. Further, in exemplary embodiments, the protrusion 54 has a threaded outer surface 59.

The protrusion 54 is further configured for engaging the hole 34 defined in the spot face 32 on the casing 30. For example, the hole 34 may have a certain cross-sectional shape, such as circular, square, rectangular, oval, triangular, or any other suitable polygonal shape, and size. The protrusion 54 may have a similar shape and size such that it may fit into the hole 34. In exemplary embodiments, the shape and size of the protrusion 54 is substantially identical to the shape and size of the hole 34, such that the protrusion 54 fits relatively snugly within the hole 34. Thus, in exemplary embodiments, the outer width or diameter 56 of the protrusion 54, as shown in FIGS. 6 and 7, may be substantially identical to the inner width or diameter 36 of the hole 34.

Further, in exemplary embodiments as discussed above, the protrusion 54 and hole 34 are threaded, as shown by threaded inner wall 38 and threaded outer surface 59 in FIGS. 6 and 7. The threaded outer surface 59 of protrusion 54 may engage the threaded inner wall 38 of the mating hole 34 when the protrusion 54 is engaged in the hole 34, and engagement of the protrusion 54 in the hole 34 may involve screwing the protrusion 54 into the hole 34 to engage the mating threads.

The jig 50 further includes at least one machining passage 60. Each machining passage 60 is defined in the body 52. Further, the machining passages 60 may be positioned in an array within the body 52. Such array may, in some embodiments, peripherally surround the protrusion 54. Any number of machining passages 60 may be included in the jig 50. For example, while in exemplary embodiments three passages 60 are defined in the body, it should be understood that one, two, four, five, or more passages may alternatively be defined. Further, in some embodiments, the passages 60 may be approximately equally spaced apart from each other in an array. For example, in embodiments wherein there are three passages 60, the passages 60 may be spaced 120° apart. If there are two passages 60, the passages 60 may be spaced 180° apart, while if there are four passages 60, the passages 60 may be spaced 90° apart, and so on.

As shown, in some embodiments, the machining passages 60 are defined parallel to the central protrusion 54. For example, the machining passages 60 may extend through the body 52 parallel to axis 58 of the protrusion 54. Alternatively, however, the machining passages 60 may extend at any suitable angle with respect to axis 58. Further, as shown in FIG. 9, each machining passage 60 may have an inner width or diameter 62.

The machining passages 60 are provided in jig 50 for machining installation holes 64 into the casing 30 through a spot face 32. For example, an installation hole 64 may be drilled through a machining passage 60 into the casing 30 and, optionally, tapped. Such machining of an installation hole 64 using a machining passage 60 allows for the installation hole 64 to be precisely positioned and oriented. After removal of the jig 50, the installation hole 64 may be utilized to mount or otherwise install a probe onto the casing 30. For example, a stud for the probe may be installed within the installation hole 64, and the probe installed by attaching to the stud or otherwise securing in place.

To facilitate machining of an installation hole 64 through a machining passage 60, the jig 50 may include at least one bushing 70. Further, in exemplary embodiments, one or more bushings 70 may be provided for each machining passage 60. Each bushing 70 is configured to engage a machining passage 60. For example, a passage 60 may have a certain cross-sectional shape, such as circular, square, rectangular, oval, triangular, or any other suitable polygonal shape, and size. The bushing 70 may have a similar shape and size such that it may fit into a passage 60. In exemplary embodiments, the shape and size of the bushing 70 is substantially identical to the shape and size of the passage 60, such that the bushing 70 fits relatively snugly within the passage 60. Thus, in exemplary embodiments, the outer width or diameter 72 of the bushing 70, as shown in FIG. 9, may be substantially identical to the inner width or diameter 62 of a passage 60.

Further, each bushing 70 defines a passage 74 therethrough, as shown in FIG. 8. The passage 74 has an inner width or diameter 76. The passage 74 is designed for receiving a drill bit or other suitable machining device therethrough for drilling or otherwise machining an installation hole 62. The passage 74 may thus be optimally sized, with a suitable inner width or diameter 76, such that the drill bit or other suitable machining device is precisely oriented and aligned therein.

In some embodiments, the bushings 70 may be coupled to the jig 50. For example, mating bores 80 and 82 may be defined in the body 52 and bushing 70, respectively. A wire, chain, or other suitable coupling apparatus 84 may be run through the bores 80 and 82 to couple a bushing 70 to the jig 50.

As discussed above, machining of an installation hole 64 may include drilling and tapping the hole 64 through a machining passage 60 defined in the jig. The bushing 70 may be engaged in the machine passage 60 to drill the hole 64, and then disengaged from the machine passage 60 to tap the hole 64. Alternatively, however, a bushing 70 or multiple bushings 70, such as bushings 70 having various inner diameters 76, may be utilized to drill and tap the hole 64, or the hole 64 may be drilled and tapped without the use of any bushing 70.

As shown in FIGS. 4 through 9, the jig 50 further includes at least one alignment feature 90. Each alignment feature 90 is configured on the body 52. For example, in exemplary embodiments, an alignment feature 90 may include an alignment passage 92 defined in the body 52 and an alignment pin 94 associated with the alignment passage 92. Further, the alignment passage 92 may have a threaded inner wall 96 and the alignment pin 94 may have a mating threaded outer surface 98. Thus, the alignment pin 94 may be, for example, a screw or other suitable threaded component.

Each alignment feature 90 may be provided for aligning the jig 50 with respect to the casing 30. Thus, when the jig 50 is properly positioned with respect to the casing 30, such as properly leveled and/or oriented, the alignment features 90 may secure the jig 50 in this position to provide a precise alignment of the jig 50. For example, in embodiments wherein the alignment feature 90 includes an alignment passage 92 and associated alignment pin 94, when the jig 50 is properly positioned, the alignment pin 94 is engaged with the passage 92 and into contact with the spot face 32. For example, the alignment pin 94 may be screwed into the passage 92 such that the threads of the passage 92 and pin 94 are engaged and until the pin 94 contacts the spot face 32. Further, each pin 94 may be engaged to a specified torque, if desired or required. Engagement of the pins 94 with the spot face 32 may securely align the jig 50. For example, engagement of the pins 94 may tension the engagement between the protrusion 54 and the hole 34, such as the threaded engagement between the threaded inner wall 38 and the threaded outer surface 59. This tension may securely align the jig 50 with respect to the casing 30, thus preventing or reducing the risk of movement of the jig 50 with respect to the casing 30.

It should be understood that while an exemplary alignment feature 90 according to the present disclosure includes an alignment passage 92 and alignment pin 94, any suitable component for aligning the jig 50 may further be considered an alignment feature within the scope and spirit of the present disclosure.

The alignment features 90 may be positioned in an array about or within the body 52. Such array may, in some embodiments, peripherally surround the protrusion 54. Any number of alignment features 90 may be included in the jig 50. For example, while in exemplary embodiments three alignment features 90 are defined in the body, it should be understood that one, two, four, five, or more alignment features 90 may alternatively be defined. Further, in some embodiments, the alignment features 90 may be approximately equally spaced apart from each other in an array. For example, in embodiments wherein there are three alignment features 90, the alignment features 90 may be spaced 120° apart. If there are two alignment features 90, the alignment features 90 may be spaced 180° apart, while if there are four alignment features 90, the alignment features 90 may be spaced 90° apart, and so on.

As shown, in some embodiments, the alignment features 90 are defined parallel to the central protrusion 54. For example, the alignment features 90 may extend through the body 52 parallel to axis 58 of the protrusion 54. Alternatively, however, the alignment features 90 may extend at any suitable angle with respect to axis 58.

As shown in FIGS. 4 and 5, in some embodiments, the jig 50 may further include at least one orientation feature 100. The orientation feature 100 may be provided for orienting the jig 50 with respect to the casing 30. For example, as shown, the orientation feature 100 may be an arrow. The arrow may be drawn on, machined into, or otherwise provided on the jig 50. As shown, the arrow points in the general direction of two machining passages 60 and away from a third machining passage 60, and thus is provided for orienting the jig 50 with regard to the machining passages 60 and/or the casing 30. In other embodiments, the orientation feature 100 may be provided for any suitable orientation of the jig 50 with regard to any feature of the jig 50, and may have any suitable shape or size.

The orientation feature 100 may, in exemplary embodiments, orient the jig 50 with respect to various features, such as hooks or other protrusions, which are inside the casing 30 and thus not visible from exterior to the casing 30. For example, it may be desirable for the installation holes 64 to have a certain orientation with respect to such various non-visible features. The orientation feature 100 may indicate a desired orientation with respect to these features, such that the installation holes 64 that result from use of the jig 50 have that desirable orientation and location.

In some embodiments, as shown in FIGS. 4 through 9, the jig 50 may further comprise at least one leveling feature 110. The leveling feature 110 may be provided for leveling the jig 50. For example, in exemplary embodiments as shown, the leveling feature 110 may be a channel defined in a surface, such as an upper surface, of the jig 50. The channel may allow for precise placement of a suitable leveling device (not shown), to evaluate and level the jig 50. Alternatively, however, the leveling feature 110 may be any suitable leveling device or apparatus.

The present disclosure is further directed to a method for modifying a casing 30 in a turbine system 10. The method may include, for example, engaging a jig 50 with a hole 34 defined in a spot face 32 on the casing 30, as discussed above. The method may further include aligning the jig 50 with respect to the casing 30 and machining at least one installation hole 64 into the casing 30 through the spot face 32, as discussed above. In some embodiments, the method may further include orienting the jig 50 with respect to the casing 30 and/or leveling the jig 50, as discussed above.

Thus, the present disclosure provides a jig 50 and a method for modifying a casing 30 that are precise, accurate, and consistent. Further, the present jig and method may advantageously allow for in-field modification of a casing 30, thus reducing the time and expense associated with such modification.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jig for modifying a casing in a turbine system, the jig comprising:
   a body;
   a protrusion extending from the body and configured for engaging a hole defined in a spot face on the casing;
   at least one machining passage defined in the body, the machining passage provided for machining the casing therethrough;
   at least one removable bushing configured to engage the at least one machining passage; and
   at least one alignment feature configured on the body, the at least one alignment feature provided for aligning the jig with respect to the casing, wherein the at least one alignment feature comprises an alignment passage and alignment pin, the alignment passage defined in the body and including a threaded inner wall and the alignment pin including a mating threaded outer surface, the alignment pin configured to engage the passage and contact the spot face to align the jig with respect to the casing.

2. The jig of claim 1, wherein the at least one machining passage is defined parallel to the central protrusion.

3. The jig of claim 1, further comprising a plurality of machining passages.

4. The jig of claim 1, further comprising three machining passages spaced approximately 120° apart.

5. The jig of claim 1, further comprising a plurality of alignment features.

6. The jig of claim 1, further comprising three alignment features spaced approximately 120° apart.

7. The jig of claim 1, wherein the alignment passage is defined in the body parallel to the machining passage.

8. The jig of claim 1, further comprising at least one orientation feature for orienting the jig with respect to the casing.

9. The jig of claim 1, further comprising at least one leveling feature for leveling the jig.

10. A jig for modifying a casing in a turbine system, the jig comprising:
    a body;
    a protrusion extending from the body and configured for engaging a hole defined in a spot face on the casing;
    at least one machining passage defined in the body, the machining passage provided for machining the casing therethrough; and
    at least one alignment feature configured on the body, the at least one alignment feature provided for aligning the jig with respect to the casing, wherein the at least one alignment feature comprises an alignment passage and alignment pin, the alignment passage defined in the body and including a threaded inner wall and the alignment pin including a mating threaded outer surface, the alignment pin configured to engage the passage and contact the spot face to align the jig with respect to the casing.

11. The jig of claim 10, wherein the at least one machining passage is defined parallel to the central protrusion.

12. The jig of claim 10, further comprising a plurality of machining passages.

13. The jig of claim 10, further comprising three machining passages spaced approximately 120° apart.

14. The jig of claim 10, further comprising a plurality of alignment features.

15. The jig of claim 10, further comprising three alignment features spaced approximately 120° apart.

16. The jig of claim 10, wherein the alignment passage is defined in the body parallel to the machining passage.

17. The jig of claim 10, further comprising at least one bushing configured to engage the at least one machining passage.

18. The jig of claim 10, further comprising at least one orientation feature for orienting the jig with respect to the casing.

19. The jig of claim 10, further comprising at least one leveling feature for leveling the jig.

* * * * *